US008213273B2

(12) United States Patent
Yoneda

(10) Patent No.: US 8,213,273 B2
(45) Date of Patent: *Jul. 3, 2012

(54) CONTENT REPRODUCTION SYSTEM, CONTENT REPRODUCTION APPARATUS, AND CONTENT REPRODUCTION METHOD

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/030,646

(22) Filed: Feb. 18, 2011

(65) Prior Publication Data
US 2011/0144782 A1    Jun. 16, 2011

Related U.S. Application Data

(63) Continuation of application No. 12/793,986, filed on Jun. 4, 2010, now Pat. No. 7,894,310, which is a continuation of application No. 11/351,027, filed on Feb. 9, 2006, now Pat. No. 7,742,369.

(30) Foreign Application Priority Data

Feb. 9, 2005  (JP) ................. 2005-033406

(51) Int. Cl.
G11B 7/085    (2006.01)
(52) U.S. Cl. ................ 369/30.08; 386/241; 709/203
(58) Field of Classification Search ............... 369/30.08, 369/47.24, 30.03, 30.07, 30.09; 725/90, 725/102; 709/231, 203; 386/200, 248, 241, 386/96, 83, 98, 126, 69
See application file for complete search history.

(56) References Cited

U.S. PATENT DOCUMENTS
6,901,462 B2    5/2005    Minoshima et al.
(Continued)

FOREIGN PATENT DOCUMENTS
JP    02-128587    5/1990
(Continued)

OTHER PUBLICATIONS

Roku Inc: "SoundBridge Network Music Player User Guide Software v. 2.1"; www.Roku.com, [online] Jan. 20, 2005, XP002381038 retrieved from the Internet:URL:http//web.archive.org/web/20050401115809/www.rokulabs.com/support/SB-guide-web-012005.pdf> [retrieved on May 15, 2005]; pp. 17, 18, 20, 25.

(Continued)

*Primary Examiner* — Ali Neyzari
(74) *Attorney, Agent, or Firm* — Wolf, Greenfield & Sacks, P.C.

(57) ABSTRACT

The present invention provides a content reproduction system that can continue reproduction of a plurality of content even if a part of content is unreproducible. The content reproduction system includes a content storage apparatus including a content storage section that stores a plurality of content whose reproduction order has previously been specified based on reproduction order information, and a content reproduction apparatus including a communication section that communicates with the content storage apparatus, a request section that requests the content storage apparatus to transmit content stored in the content storage section in the order according to the reproduction order information, and a reproduction section that reproduces the content, wherein when content that the request section has requested from the content storage apparatus is unreproducible, the request section requests the content storage apparatus to transmit content which is listed as content to be reproduced subsequent to the unreproducible content in the reproduction order information.

20 Claims, 6 Drawing Sheets

U.S. PATENT DOCUMENTS

| | | | |
|---|---|---|---|
| 7,092,615 | B2 | 8/2006 | Tanikawa et al. |
| 7,330,901 | B2 * | 2/2008 | Yoneda et al. ............... 709/231 |
| 7,349,976 | B1 | 3/2008 | Glaser et al. |
| 7,526,567 | B2 * | 4/2009 | Yoneda et al. ............... 709/231 |
| 7,742,369 | B2 | 6/2010 | Yoneda |
| 7,894,310 | B2 * | 2/2011 | Yoneda ................. 369/30.08 |
| 2002/0073136 | A1 | 6/2002 | Itoh et al. |
| 2004/0249969 | A1 | 12/2004 | Price |
| 2004/0267952 | A1 | 12/2004 | He et al. |
| 2007/0050479 | A1 | 3/2007 | Yoneda |

FOREIGN PATENT DOCUMENTS

| | | |
|---|---|---|
| JP | 03-169181 | 7/1991 |
| JP | 2001-242876 A | 9/2001 |
| JP | 2001-243694 A | 9/2001 |
| JP | 2001-265632 A | 9/2001 |
| JP | 2001-283018 A | 10/2001 |
| JP | 2002-073041 A | 3/2002 |
| JP | 2002-100120 A | 4/2002 |
| JP | 2002-108687 A | 4/2002 |
| JP | 2002-157201 | 5/2002 |
| JP | 2003-006026 A | 1/2003 |
| JP | 2003-036654 A | 2/2003 |
| JP | 2004-086558 | 3/2004 |
| JP | 2004-241095 A | 8/2004 |
| JP | 2004-274619 A | 9/2004 |
| JP | 2005-005964 A | 1/2005 |
| JP | 2005-150961 A | 6/2005 |
| JP | 2005-167891 A | 6/2005 |
| JP | 2005-276349 A | 10/2005 |

OTHER PUBLICATIONS

Staff: "Itunes 4 tip—Sharing Itunes Libraries Over IP, It's not just for Rendezvous" Mac Observer, [online] Apr. 29, 2003, XP002381039 retrieved from the Internet: URL:http://www.macobserver.com/article/200 3/04/28.14.shtml>[retrieved on May 15, 2006]; whole doc.
Gene_Wood: "WINAMP.com Forums—Windows 2k and XP. Winamp stops the stream." [online]; Jan. 2, 2005, XP002381040 Retrieved from the Internet: URL:http://forums.winamp.com/showthread.php?postid=1243009> [retrieved on May 15, 2006; pp. 6, 10.
Sawg: "The unofficial M3U and PLS Specification" www.SCVI.net, [online]; Feb. 4, 2005, XP002381041 retrieved from the Internet: URL:http//ww.scvi.net/pls.htm> [retrieved on May 15, 2006] ¶ 1 and 5.
Iprogram Development: "MP3 Playlist—Create MP3 Playlist with Visual MP3" Iprogram Development, [online] Feb. 2, 2004, XP002381042 retrieved from the Internet: URL:http//web.archive.org/web/20040202053920/http://www.iprogramdev.com/vmp3/mp3-playlister.htm> [retrieved on May 15, 2006; whole doc.
P. Cosson: "Slim Devices Introduces Slimserver", Slim Devices Official Website, [online] Nov. 18, 2003, XP002381043; retrieved from the Internet: URL:http://www.slimdevices.com/au_press_slimserver.html> [retrieved on May 15, 2006]; whole doc.

* cited by examiner

| Reproduction order | Content name | Content type | Sampling frequency | Channel number | Bit number | URL |
|---|---|---|---|---|---|---|
| 1 | ... | PCM | ... | ... | ... | ... |
| 2 | ... | PCM | ... | ... | ... | ... |
| 3 | ... | MP3 | ... | ... | ... | ... |
| 4 | ... | PCM | ... | ... | ... | ... |
| 5 | ... | PCM | ... | ... | ... | ... |
| 6 | ... | PCM | ... | ... | ... | ... |
| 7 | ... | JPEG | ... | ... | ... | ... |
| 8 | ... | ... | | ... | ... | ... |
| ... | ... | ... | | | | |

FIG.2

CONTENT REPRODUCTION SYSTEM, CONTENT REPRODUCTION APPARATUS, AND CONTENT REPRODUCTION METHOD

CROSS REFERENCES TO RELATED APPLICATIONS

This application is a continuation of prior application Ser. No. 12/793,986, filed Jun. 4, 2010, which is a continuation of prior application Ser. No. 11/351,027, filed Feb. 9, 2006, which claims the priority benefit of Japanese patent application number 2005-033406, filed in the Japanese Patent Office on Feb. 9, 2005, each of which is hereby incorporated by reference to the maximum extent allowable by law.

BACKGROUND OF THE INVENTION

1. Field of the Invention

The present invention relates to a content reproduction system, a content reproduction apparatus, and a content reproduction method that sequentially reproduce a plurality of content.

2. Description of the Related Art

In the past, an optical recording medium such as CD (Compact Disc) or MD (Mini Disc™) has been available. Not only music content, but also management information of the music content is recorded on such an optical recording medium. The management information includes items of start/end address of content, title of a recording medium, title of music, artist name, and the like. Information related to reproduction order is not recorded in TOC (Table Of Contents) which is management information of a CD. In the CD, content is reproduced in the order that it has been recorded on the CD. On the other hand, a management table that manages the reproduction order of the content is recorded in UTOC (User Table Of Contents) which is management information of an MD. The management table describes a recording position of the content and a music number of the content corresponding to the recording position. The management table can be rewritten by a user side. The MD can sequentially reproduce content in a user-specified order (refer to, for example, Jpn. Pat. Appln. Laid-Open Publication No. 2003-36654).

In recent years, a content reproduction system that connects a server and a client by a network and allows the client to reproduce content stored in the server has existed. In such a content reproduction system, reproduction order information is stored in the server. The reproduction order information includes items of album list, playlist, reproduction order list classified by artist's name, and the like. When reproducing content in the content reproduction system in a sequential manner, a user selects desired reproduction order information such as album list or playlist. The client outputs a content transmission request to the server according to received reproduction order information. The server transmits content in response to the transmission request issued by the client.

SUMMARY OF THE INVENTION

In recent years, a content format has been diversified. In order to reproduce content of various formats, a decoder that converts content into a desired reproduction signal is necessary. For example, an MP3 (MPEG Audio layer 3) decoder is necessary in order to reproduce MP3 music content. When a client in a conventional system receives content of a format that the client cannot reproduce, the client determines that the content is unreproducible and stops reproduction operation after reproducing reproducible portion.

The user instructs the client to sequentially reproduce a plurality of music pieces in units of album or playlist. Although the user has designated a given album or playlist, sequential reproduction of all music pieces is forced to stop due to existence of only one unreproducible music piece in the album. Accordingly, the user needs to perform additional operation for the client for the reproduction of remaining music pieces.

The present invention has been made in view of the above problem, and it is desirable to provide a content reproduction system and a content reproduction apparatus capable of continuing reproduction operation even if there is any unreproducible content in a plurality of content to be reproduced in a sequential manner.

According to the present invention, there is provided a content reproduction system including: a content storage apparatus including a content storage means for storing a plurality of content whose reproduction order has previously been specified based on reproduction order information; and a content reproduction apparatus including: a communication means for communicating with the content storage apparatus; a request means for requesting the content storage apparatus to transmit content stored in the content storage means in the order according to the reproduction order information; and a reproduction means for reproducing the content, wherein when content that the request means has requested from the content storage apparatus is unreproducible, the request means requests the content storage apparatus to transmit content which is listed as content to be reproduced subsequent to the unreproducible content in the reproduction order information.

According to the present invention, there is provided a content reproduction apparatus including: a reproduction order information acquisition means for acquiring the reproduction order information related to content; a content acquisition means for acquiring content in the order according to the reproduction order information; a reproduction means for reproducing the content, wherein when the content acquired by the content acquisition means is unreproducible, content which is listed as content to be reproduced subsequent to the unreproducible content in the reproduction order information is acquired and reproduced.

According to the present invention, there is provided a content reproduction method including: a reproduction order information acquisition step of acquiring the reproduction order information describing the reproduction order of content; a readout step of reading out content stored in content storage means in the order according to the reproduction order information; a subsequent content readout step of, when content listed in the reproduction order information is unreproducible, reading out content which is listed in the reproduction order information as content subsequent to unreproducible content; and reproduction step of reproducing the readout content.

In the case where content to be reproduced is unreproducible, the content reproduction system according to the present invention requests the content storage apparatus to transmit content which is listed in the reproduction order information as content to be reproduced subsequent to the unreproducible content. Then, when the requested content is reproducible, the system uses the reproduction means to reproduce the content. Thus, even if unreproducible content exists in the reproduction order information, it is possible to continue sequential reproduction using only reproducible content.

BRIEF DESCRIPTION OF THE DRAWINGS

FIG. 2 is a view showing an example of a reproduction list;

DETAILED DESCRIPTION OF THE PREFERRED EMBODIMENTS

Figure 1:
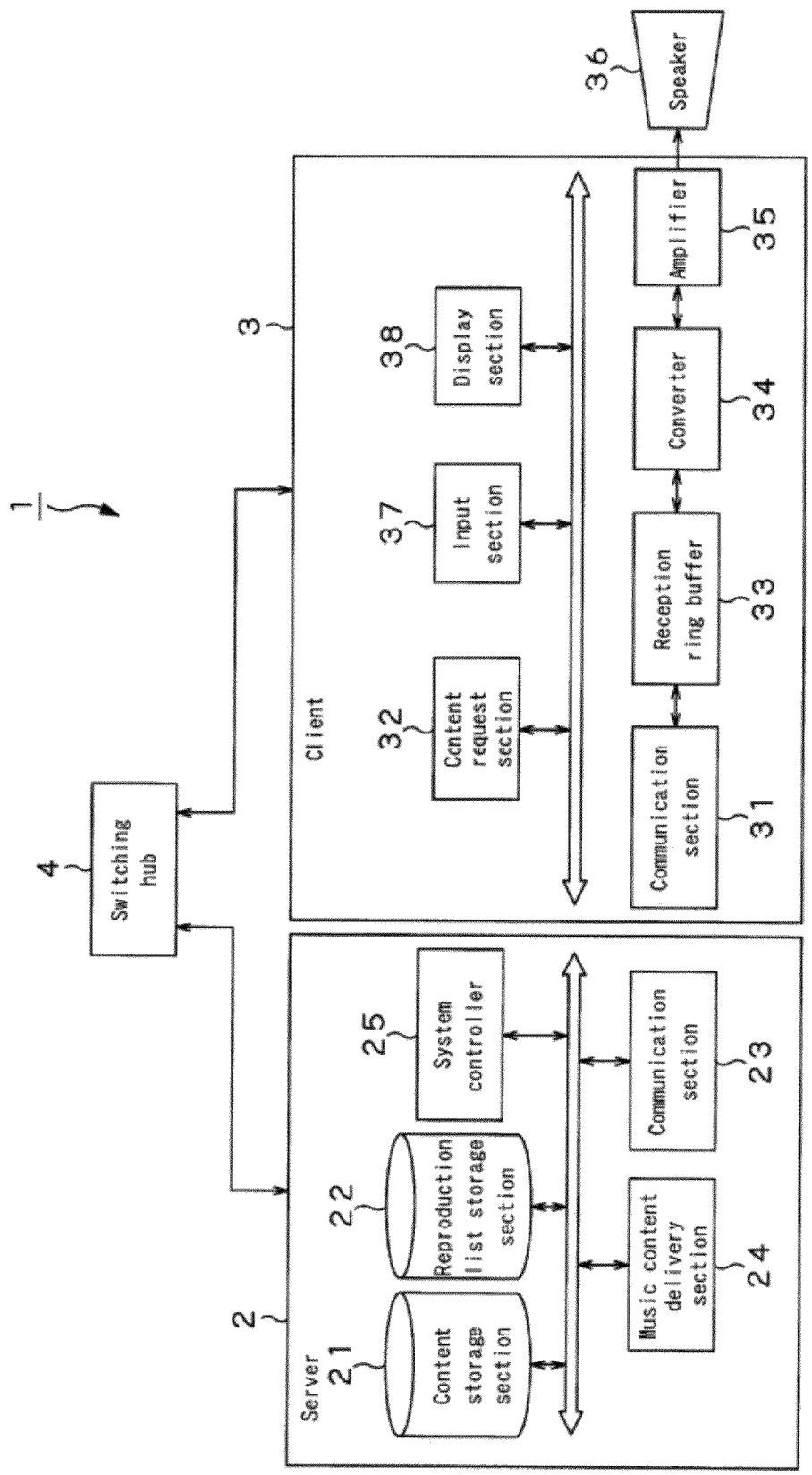
FIG. 1 is a block diagram showing a configuration of a content reproduction system.

A content reproduction system 1 according to the present invention will be described below with reference to the accompanying drawings. FIG. 1 shows a configuration of the content reproduction system 1. The content reproduction system 1 includes a server 2 that stores content, a client 3 that reproduces the content, and a switching hub 4 that relays communication between the server 2 and the client 3. The above components in the content reproduction system 1 are connected to each other by LAN (Local Area Network) and perform communication according to TCP/IP (Transport Protocol/Internet Protocol). The content reproduction system 1 may adopt another configuration or communication method.

The server 2 includes a content storage section 21 that stores music content, a reproduction list storage section 22 that stores reproduction lists of the music content, a communication section 23 that performs communication with the client 3, a music content delivery section 24 that performs a music content delivery service, and a system controller 25 that controls the entire server 2.

The content storage section 21 stores music content. The reproduction list storage section 22 stores a reproduction list that indicates the reproduction order of the music content. As shown in FIG. 2, the reproduction list describes items of music content name, content type (content format), sampling frequency, channel number, bit number, reproduction time length of music content, URL of music content, reproduction order of content, and the like. The reproduction list can be classified into album list, playlist, artist list, and the like. The album list is a reproduction list of music content included in a given album. The playlist is a user-created reproduction list of music content. The artist list is a reproduction list of music content of a single artist.

Figure 3:
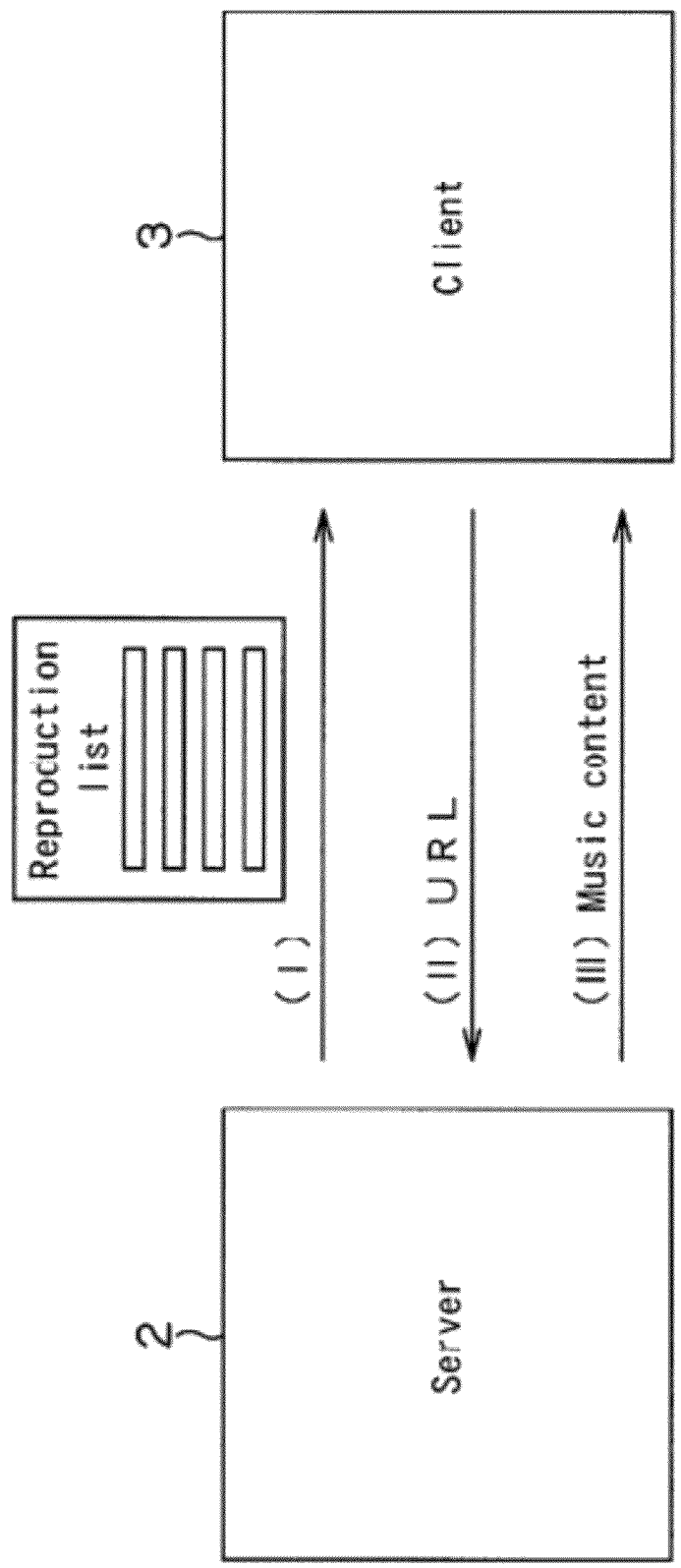
FIG. 3 is a view schematically showing processing performed by a music content delivery section.

The music content delivery section 24 delivers music content stored in the content storage section 21 to the client 3. FIG. 3 schematically shows processing performed by the music content delivery section 24. The music content delivery section 24 firstly reads out a reproduction list from the reproduction list storage section 22. The read out reproduction list is transmitted to the client 3 through the communication section 23 (I). The reproduction list describes the URLs of the music content to be reproduced. The client 3 selects music content to be reproduced from the reproduction list and transmits the URL of the selected music content to the server 2 (II). The music content delivery section 24 reads out music content corresponding to the URL received from the client 3 and transmits the readout music content to the client 3 (III).

The client 3 includes a communication section 31 that performs communication with the server 2, a content request section 32 that requests the server 2 to transmit required data thereto, a reception ring buffer 33 that temporarily stores the music content input from the server 2, a converter 34 that converts the music content transmitted from the server 2 from a digital signal into an analog signal, an amplifier 35 that outputs the analog music signal to a speaker 36, an input section 37 that receives user's operation, such as a key or remote controller, and a display section 38.

The client 3 receives music content from the server 2, converts the received music content from a digital signal to an analog signal, and reproduces the analog music signal through the speaker 36. Music content of a PCM format transmitted from the server 2 is stored in the reception ring buffer 33. At the time point when a given amount of music content is stored in the reception ring buffer 33, the music content is output to the converter 34. As a result, the music content of a given album list is sequentially reproduced without interruption between music pieces, being suitable for reproduction of a live album. The converter 34 converts a digital music signal into an analog music signal and outputs the analog music signal to the amplifier 35. The analog music signal is amplified by the amplifier 35 and thereby the music is output through the speaker 36.

Figure 4A:
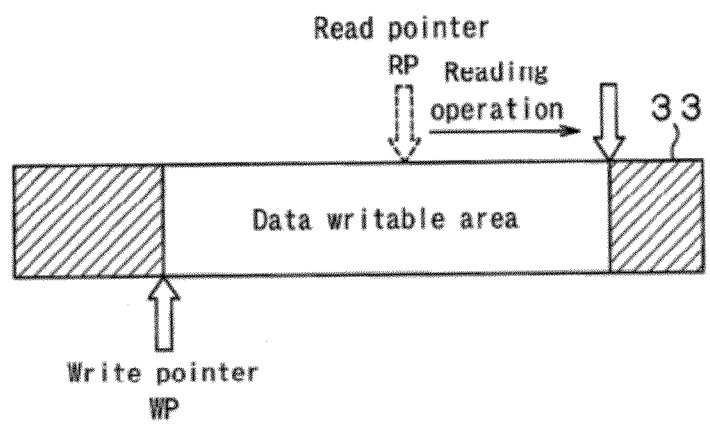
FIGS. 4A and 4B views showing operations of a reception ring buffer.
Figure 4B:
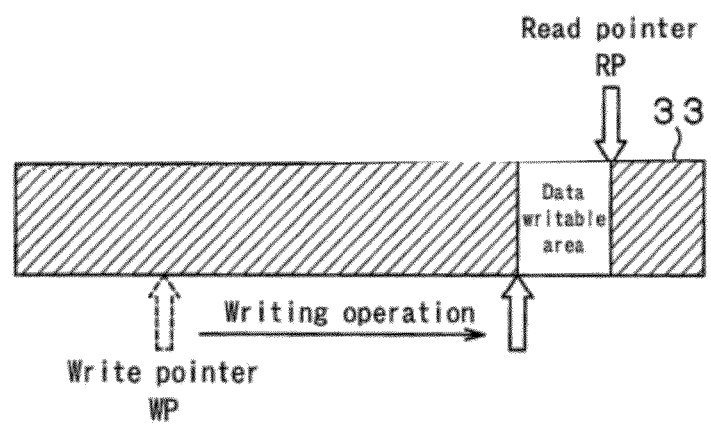

FIGS. 4A and 4B show operations of the reception ring buffer 33. A write pointer and a read pointer are set in the reception ring buffer 33. FIG. 4A shows reading operation. The data reading operation is performed at regular intervals and music content is output to the converter 34 at a regular speed. The area from which the music content has been read out according to the read pointer becomes a data writable area. FIG. 4B shows writing operation. In the writing operation, the write pointer moves in the data writable area and, when the data writable area becomes small, the reception ring buffer stops reception operation and waits until the reading operation has advanced.

The content request section 32 requests the server 2 to transmit music content thereto. The reproduction order of the content is described in the reproduction list. Upon receiving a first track, the content request section 32 requests the server 2 to transmit a second track in the list thereto. The reception ring buffer 33 writes the received second track on the area following the end of the first track. After completion of the reception of the second track, the content request section 32 requests the server 2 to transmit a third track in the list thereto. If there is no track to be reproduced next, the content request section 32 does not issue additional transmission request.

When the music content described in a reproduction list is unreproducible, the content request section 32 stops reproduction of the unreproducible music content and requests the server 2 to transmit the next music content.

When target music content is not stored in the URL listed in the reproduction list, the content request section 32 determines that this music content is unreproducible. The absence of the music content occurs due to, for example, disconnect between the URL listed in the reproduction list and actual storage area of the music content. There is a time lag between reception of a reproduction list and reception of music content. If given music content included in a reproduction list is deleted or moved after transmission of the reproduction list to the client, the target content has disappeared from the corresponding URL in the reproduction list at the reception time of the music content.

Figure 5:
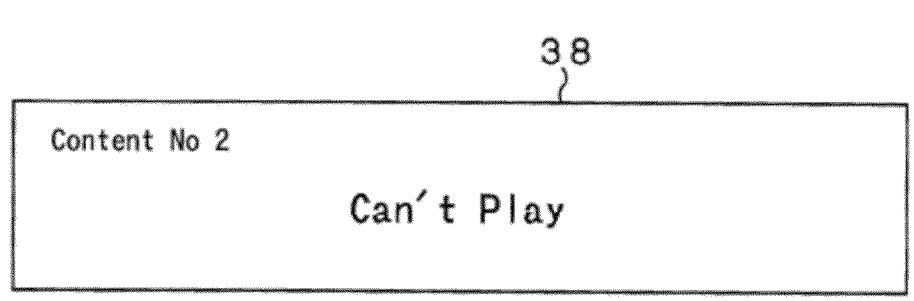
FIG. 5 is a view showing a display example for notifying a user that content cannot be reproduced.

If there is no reproducible music content, the content request section 32 notifies the user that the music content to be reproduced next is unreproducible after completing reproduction of the current music content. A message saying, "Can't play" is displayed in the display section 38 of FIG. 5 for notifying the user that the music content to be reproduced next is unreproducible. At this time, the massage may be blinked, or the title of the unreproducible music may be displayed together with the message. The content request section 32 determines the end of the music content based on the reproduction time length of the music content. The content request section 32 compares the storage amount of the music content in the reception ring buffer 33 and residual reproduction time of the currently reproduced track. The reception ring buffer 33 outputs the entire currently reproduced music content to the converter 34 based on a result of the comparison.

Then, the content request section 32 mutes audio output, reads out the URL of a track following the reproduced music content, and transmits the URL to the server 2. At the time point when a given amount of music content is stored in the reception ring buffer 33, the content request section 32 releases the mute. The reception ring buffer 33 outputs the stored music content to the converter 34.

The content request section 32 determines that music content of a format that the client 3 cannot reproduce is unreproducible content. The client 3, which is not provided with a decoder for expanding a compressed data, can only reproduce music content of a PCM format. The content request section 32 therefore determines that music content of a format other than a PCM is unreproducible content.

The format of the music content can be determined from the reproduction list. The format of the content is listed in the content type of the reproduction list of FIG. 2. The content request section 32 refers to the reproduction list and, if the content type is not a PCM format, displays in the display section 38 that it is impossible to reproduce music content, followed by request of the next music content.

Further, the format of the music content can be determined from a file header or the like of received music content. The format of the music content is included in the file header. When determining that the type of received music content is not a PCM format, the content request section 32 displays in the display section 38 that it is impossible to reproduce music content, followed by request of the next music content.

As described above, the format of the music content is determined not only from the content type of the reproduction list, but also from received music content itself. Thus, if the description of the content type in the reproduction list is wrong, it is possible to stop reproduction of unreproducible music content and issue a transmission request of the next music content.

In the case where there exist a reproducible part and unreproducible part in single music content, the content request section 32 firstly reproduces the reproducible part and, then, displays in the display section 38 that reproduction of the music content that is being reproduced has become impossible. After that, the content request section 32 reads out the URL of the music content following the one whose reproduction has been stopped and transmits the read out URL to the server 2.

The content request section 32 waits for network recovery if it cannot receive content due to a communication error. When the communication error continues for a predetermine time, the content request section 32 allows the display section 38 to display that content cannot be acquired due to a communication error.

Figure 6:
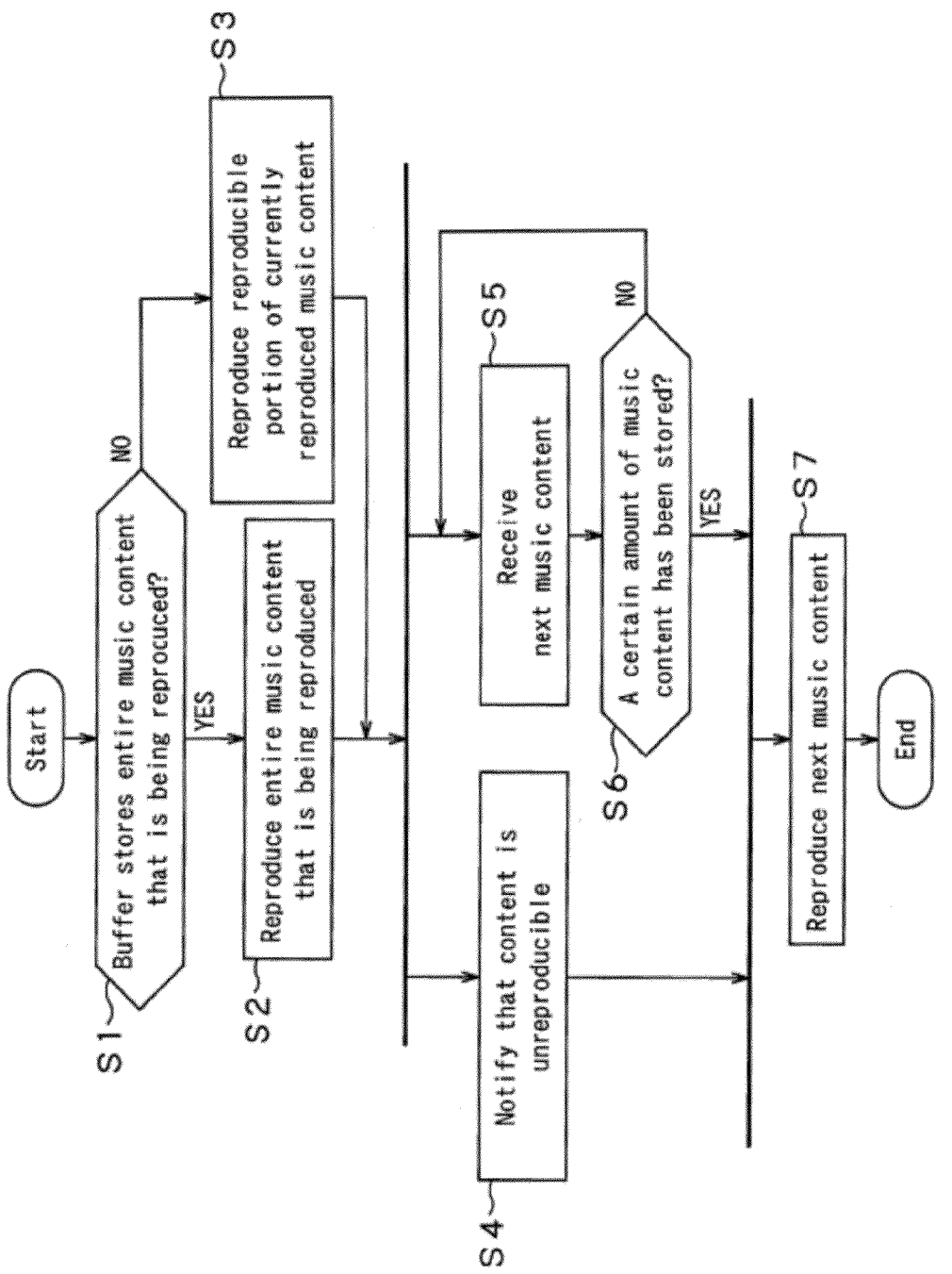
FIG. 6 is a flowchart showing operation of a client.

Operation of the client 3 will next be described with reference to a flowchart of FIG. 6. When the music content to be reproduced next is the one of an unreproducible format, the content request section 32 compares the residual reproduction time of the currently reproduced track and storage amount of the music content in the reception ring buffer 33. When determining, based on the comparison, that the reception ring buffer 33 stores the entire currently reproduced music content (step S1; YES), the content request section 32 allows the reception ring buffer 33 to output the entire currently reproduced music content to the converter 34 (step S2). On the other hand, when determining that all the currently reproduced music content is not stored in the reception ring buffer 33 (step S1; NO), the content request section 32 allows the reception ring buffer 33 to output a reproducible portion of the currently reproduced music content to the converter 34 (step S3).

The content request section 32 allows the display section 38 to display a message for notifying a user that music content is unreproducible (step S4). At the same time, the content request section 32 reads out, from the reproduction list, the URL of the music content following the unreproducible music content and outputs the read out URL to the server 2. Upon receiving the music content following the unreproducible music content from the server 2 (step S5), the content request section 32 waits until a certain amount of the music content is stored in the reception ring buffer 33 (step S6; NO). When a certain amount of the music content is stored (step S6; YES), the content request section 32 allows the reception ring buffer 33 to output the stored music content to the converter 34 (step S7). The music content output from the converter 34 is amplified by the amplifier 35 and reproduced through the speaker 36 as music.

As described above, when the reproduction list describing the reproduction order of music content includes music content of an unreproducible format, the content reproduction system 1 according to the present invention skips the unreproducible music content and reproduces the next track. Further, in the case where music content being reproduced becomes unreproducible in the middle of the reproduction, the content reproduction system 1 skips the unreproducible part after reproducing up to the reproducible position and reproduces the next track. While the reproduction operation is interrupted due to existence of the unreproducible music content in a conventional system, the content reproduction system 1 is capable of continuing reproduction operation even if there is any unreproducible content in the reproduction list.

Figure 7:
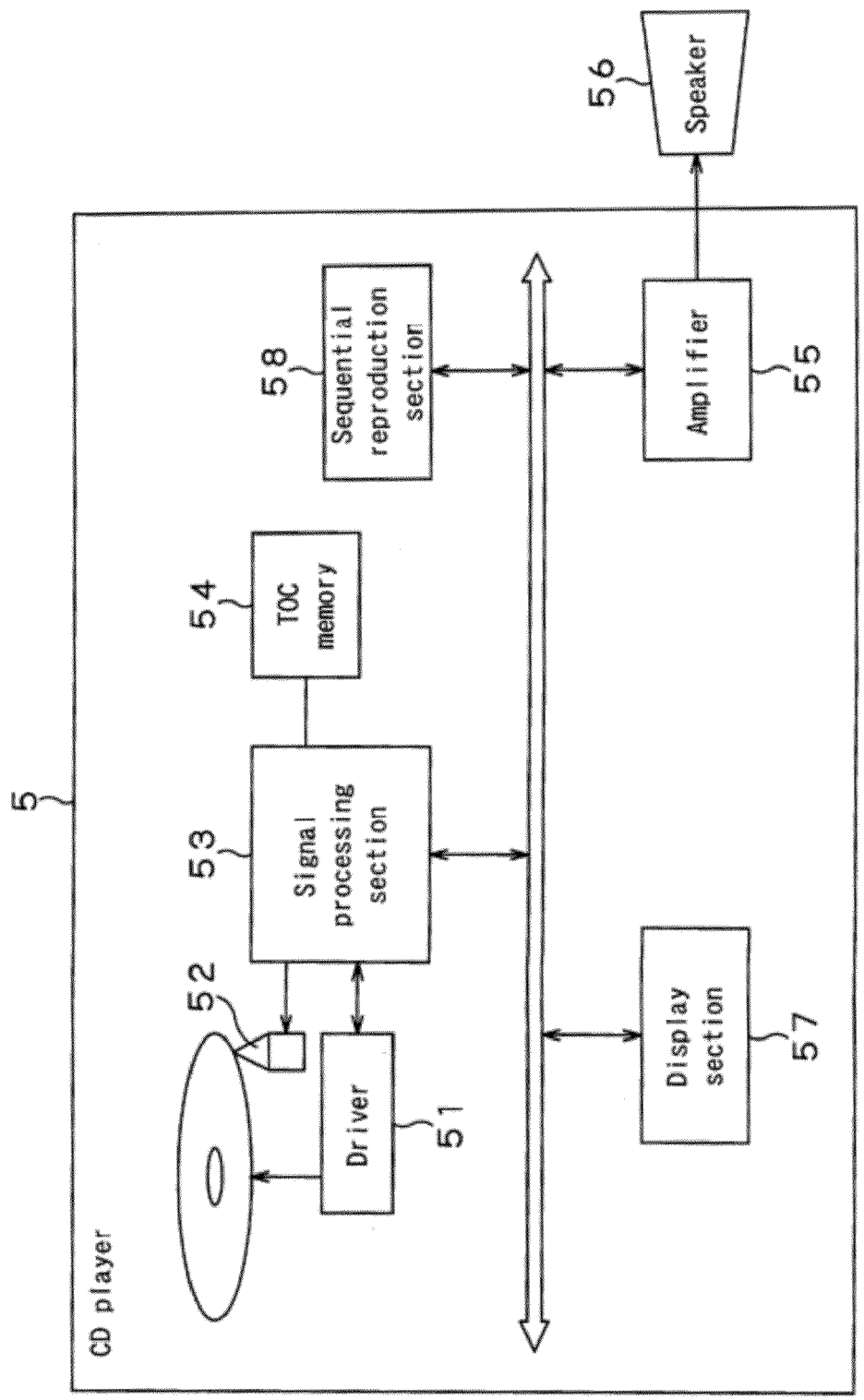
FIG. 7 is a block diagram showing a configuration of a CD player according to the present invention.

A CD (Compact Disc) player 5 according to the present invention will next be described. FIG. 7 is a block diagram showing a configuration of the CD player 5. The CD player 5 includes a driver 51 that drives/rotates a CD, a pickup section 52 that reads out optical information from the CD, a signal processing section 53 that converts an electrical signal read out from the CD into a reproduction signal, a TOC memory 54 that stores TOC (Table Of Contents) information, an amplifier 55 that amplifies the reproduction signal, a speaker 56 through which the reproduction signal is reproduced as music, a display section 57, and a sequential reproduction processing section 58 that sequentially reproduces music content recorded in the CD.

Control information called TOC is recorded in the lead-in area of a CD. The TOC includes start/end address of music content, title of music content, artist name, and the like. The information recorded in the TOC is loaded into the TOC memory 54.

When there is something wrong with currently reproduced music content and the subsequent music content, the sequential reproduction processing section 58 reads out from a memory the start address of the music content following the defective music content and starts reproduction of the readout music content. Thus, even if there is something wrong with the reproduction of music content, it is possible to continue reproduction of music.

The function corresponding to the sequential reproduction processing section 58 is applicable not only to the CD player, but also to an HDD player or MD (Mini Disc™) player.

It should be understood by those skilled in the art that various modifications, combinations, sub-combinations and alternations may occur depending on design requirements and other factors insofar as they are within the scope of the appended claims or the equivalents thereof.

What is claimed is:

1. A content reproduction apparatus for reproducing content, the content reproduction apparatus comprising:
at least one processor to:
request a content storage apparatus to transmit a plurality of content items selected from a reproduction list stored on the content storage apparatus to the content reproduction apparatus, wherein an order of the plurality of content items is specified based on reproduction order information;
receive from the content storage apparatus at least one first content item from the plurality of content items; and
when it is determined that the at least one first content item is unreproducible by the content reproduction apparatus, request the content storage apparatus to transmit at least one second content item from the plurality of content items, wherein the at least one second content item is listed in the reproduction order information as a content item to be reproduced subsequent to the at least one first content item.

2. The content reproduction apparatus of claim 1, wherein: the at least one processor requests the content storage apparatus to transmit the plurality of content items to the content reproduction apparatus based on user input.

3. The content reproduction apparatus of claim 1, wherein: the at least one first content item is determined to be unreproducible by the content reproduction apparatus based on a format of the at least one first content item.

4. The content reproduction apparatus of claim 3, wherein: the at least one first content item is determined to be unreproducible by the content reproduction apparatus when the format of the at least one first content item is different from a format that is recognized by the content reproduction apparatus.

5. The content reproduction apparatus of claim 3, wherein: the format of the at least one first content item is determined based on information in a header of the at least one first content item.

6. The content reproduction apparatus of claim 4, wherein: the format of content that is recognized by the content reproduction apparatus comprises at least one selected from the group consisting of an MP3 format and a PCM format.

7. The content reproduction apparatus of claim 1, wherein: the reproduction list comprises a location of the at least one first content item in a storage; and
the at least one first content item is determined to be unreproducible by the content reproduction apparatus when the location does not contain the at least one first content item.

8. The content reproduction apparatus of claim 7, wherein: the location of the at least one first content item comprises a URL of the at least one first content item.

9. The content reproduction apparatus of claim 1, wherein: when it is determined that the at least one first content item is unreproducible by the content reproduction apparatus, the at least one processor provides an indication to a user that the at least one first content item is unreproducible.

10. A method for reproducing a plurality of content items, the method comprising:
with at least one processor:
requesting an external apparatus to transmit a plurality of music content items selected from a reproduction list stored in the external apparatus, wherein the plurality of music content items are specified in an item list comprising identification information identifying the plurality of music content items and specifying a location of each of the plurality of music content items in a storage;
receiving, from the external apparatus, at least one first music content item from the plurality of music content items;
during reproduction of the at least one first music content item, determining whether at least one second music content item from the plurality of music content items listed in the item list as a music content item to be reproduced subsequent to the at least one first music content item is unreproducible; and
when it is determined that the at least one second content music item is unreproducible,
completing the reproduction of the at least one first music content item, and
requesting from the external apparatus at least one third music content item from the plurality of music content items, wherein the at least one third music content item is listed in the item list as a music content item to be reproduced subsequent to the at least one second music content item.

11. The method of claim 10, wherein the at least one second music content item is determined to be unreproducible based on a format of the at least one second music content item.

12. The method of claim 10, wherein the at least one second music content item is determined to be unreproducible when a location of the at least one second music content item in the storage specified in the item list does not contain the at least one second music content item.

13. The method of claim 10, further comprising, when it is determined that the at least one second music content item is unreproducible, providing an indication on a display that the at least one second music content item is unreproducible.

14. The method of claim 13, wherein the indication is provided at least partially concurrently with requesting from the storage the at least one third music content item.

15. The method of claim 13, wherein providing the indication comprises displaying text information on a display.

16. A content reproduction apparatus adapted to communicate with an external apparatus, the content reproduction apparatus comprising:
a content request section to:
request the external apparatus to transmit a plurality of content items selected from a reproduction list stored in the external apparatus to the content reproduction apparatus, wherein the plurality of content items are specified in an item list comprising identification information identifying the plurality of content items and specifying a location of each of the plurality of content items in a storage;
receive, from the external apparatus, at least one first content item from the plurality of content items;
determine whether at least a portion of the at least one first content item is unreproducible by the content reproduction apparatus; and
a content reproduction section to:
when it is determined that the at least a portion of the at least one first content item is unreproducible by the content reproduction apparatus, reproduce another portion of the at least one content item that is reproducible by the content reproduction apparatus, wherein:
when it is determined that the at least a portion of the at least one first content item is unreproducible by the content reproduction apparatus, the content request section is adapted to request the external apparatus to transmit at least one second content item from the plurality of content items that is listed in the item list as a content item to be reproduced subsequent to the at least one first content item.

17. The content reproduction apparatus of claim 16, wherein:

when it is determined that the at least a portion of the at least one first content item is unreproducible by the content reproduction apparatus, the content request section provides an indication on a display that the at least a portion of the at least one first content item is unreproducible.

18. The content reproduction apparatus of claim 17, wherein:

the indication comprises a title of the at least one first content item.

19. The content reproduction apparatus of claim 16, wherein:

the item list is received from the external apparatus via a local area network.

20. The content reproduction apparatus of claim 16, wherein:

the item list comprises at least one selected from the group consisting of an album list, a playlist and an artist list, and wherein the plurality of content items comprise a plurality of music pieces.

* * * * *